Figure 1:
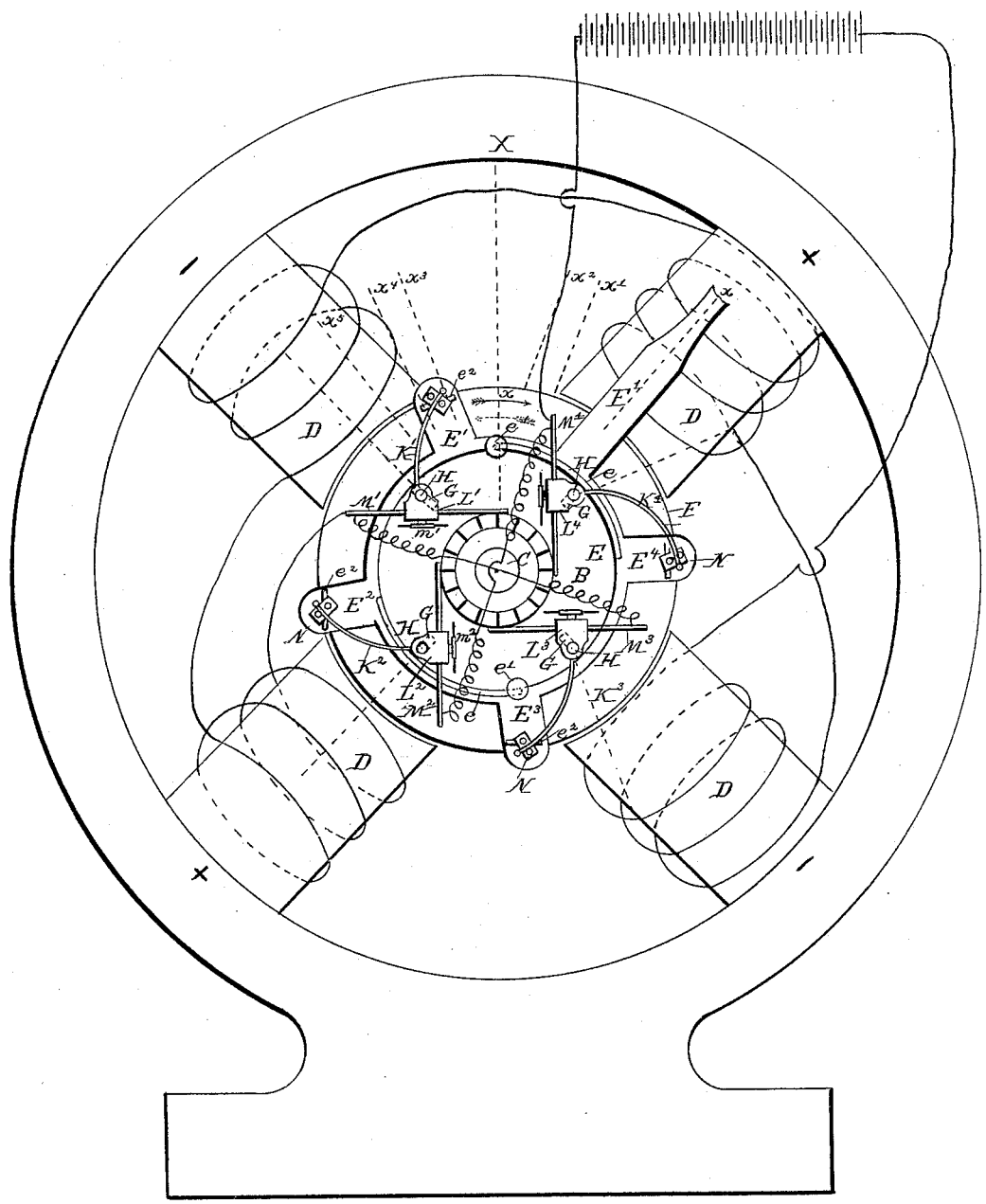

(No Model.) 3 Sheets—Sheet 1.

S. C. C. CURRIE.
ELECTRIC MOTOR.

No. 408,590. Patented Aug. 6, 1889.

(No Model.) 3 Sheets—Sheet 2.
S. C. C. CURRIE.
ELECTRIC MOTOR.
No. 408,590. Patented Aug. 6, 1889.
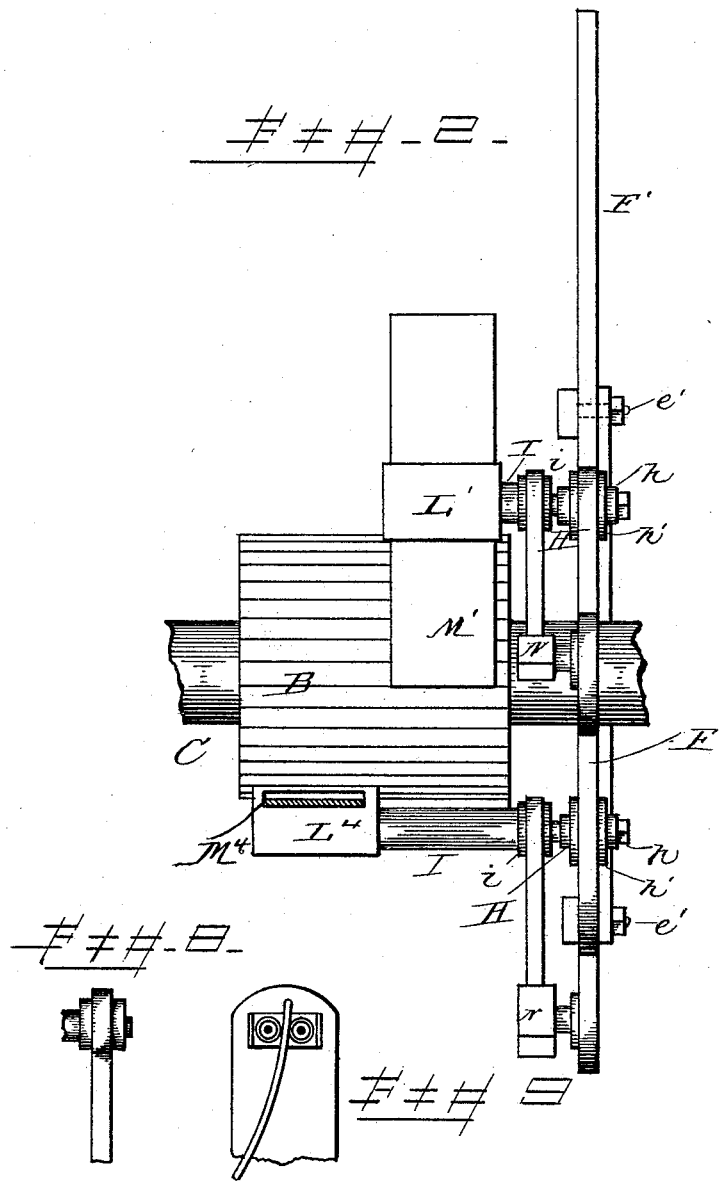

(No Model.)　　　　　S. C. C. CURRIE.　　　3 Sheets—Sheet 3.
ELECTRIC MOTOR.
No. 408,590.　　　　　　　Patented Aug. 6, 1889.
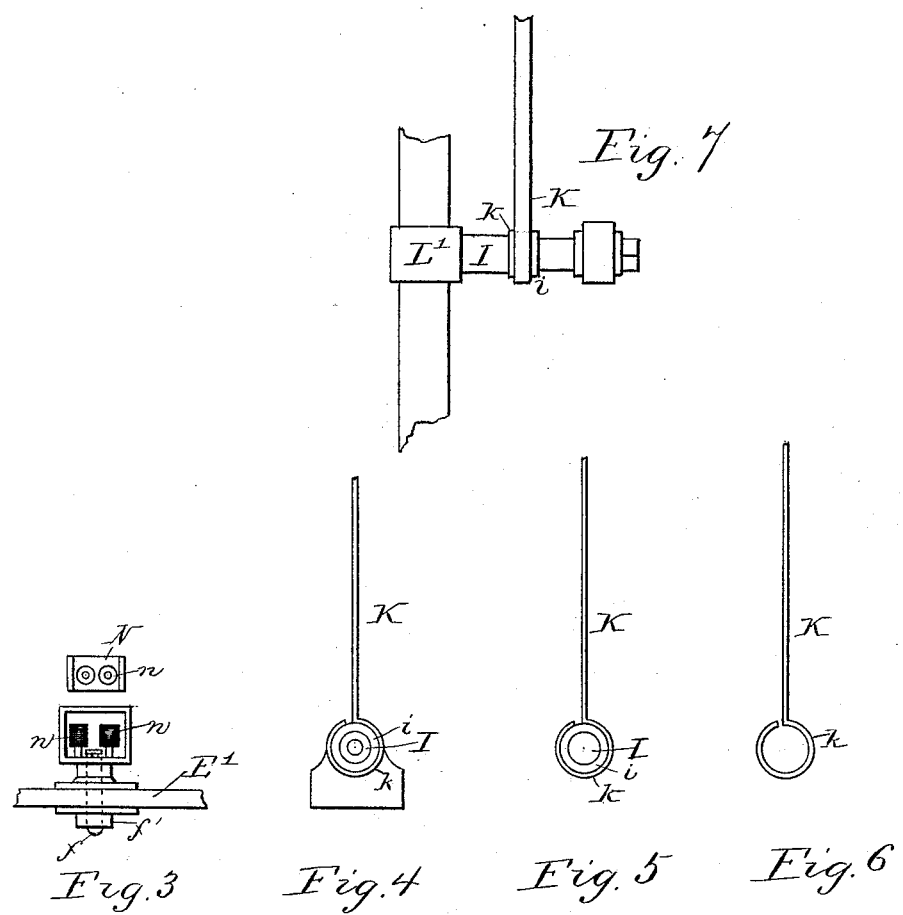

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

ELECTRIC MOTOR.

SPECIFICATION forming part of Letters Patent No. 408,590, dated August 6, 1889.

Application filed October 9, 1888. Serial No. 287,614. (No model.)

*To all whom it may concern:*

Be it known that I, STANLEY C. C. CURRIE, a subject of the Queen of Great Britain, residing at Philadelphia, in the county of Philadelphia and State of Pennsylvania, have invented certain new and useful Improvements in Electric Motors; and I do hereby declare the following to be a full, clear, and exact description of the invention, reference being had to the accompanying drawings, which form part of this specification.

My invention has relation to electric motors, and has special relation to that class of motors wherein there are more than two active poles, and which have in consequence more than two brushes on the commutator.

My invention has for its object the provision of means whereby the power of the motor can be graduated according to the number of brushes on the commutator; and my invention has for its further object the provision of means whereby the direction of motion of the motor can be readily and easily reversed and the power of the motor increased or diminished in equivalent graduations for both the forward and backward movements of the armature.

My invention consists in the provision of novel means whereby, in a motor having more than two brushes adapted to contact with the commutator, the brushes may be successively thrown into or out of contact with the commutator to increase or decrease the power of the motor.

My invention further consists in the provision of means whereby, in a motor provided with more than two brushes, the direction of motion of the moving portions of the motor may be readily and speedily reversed and the power increased gradually from the starting-point in either direction.

My invention still further consists in the novel construction, combinations, and arrangements of parts hereinafter described.

In carrying my invention into effect I provide a number of brushes, equal to the number of active poles which the motor may have, and secure each brush at or about its center to a holder that is swiveled upon a stationary frame, and to each such holder I attach one end of a spring, the other end of which passes between a pair of jaws, rollers, or equivalent guides secured upon a frame movable in a direction concentric with the commutator and provided with a suitable handle. The jaws or rollers which embrace the springs are so arranged relatively to the swiveled brush-holders that upon moving the frame upon which they are carried the brushes are caused to make contact or break contact with the commutator in succession, thereby gradually increasing or decreasing the power of the motor.

The movable frame and its attached gripping-jaws are also arranged so that upon passing a certain point, and after all the brushes have been caused to break contact with the commutator, the opposite ends of said brushes will be successively brought into contact with the commutator.

Referring to the accompanying drawings, wherein I have illustrated a motor having my improvements applied thereto, Figure 1 is an elevation of the motor, looking toward the end of the commutator; Fig. 2, a top view of the commutator and appurtenances; and Figs. 3, 4, 5, 6, 7, 8, and 9, detail views of parts of the same.

A designates the armature, B the commutator, C the main shaft, and D the field-magnet poles, all constructed in the usual or any appropriate manner. At or near one end of commutator B and concentric with shaft C is a fixed circular plate or disk E. Said plate E is embraced by a metallic ring F, having a handle F', by means of which it may be moved in either direction around the plate, the amount of motion being limited by a slot $e$ in the ring, through which passes a stud $e'$ on the plate. At equal distances apart and near the edge of plate E are a number of radial slots G, through which pass pins H H, screw-threaded to receive nuts $h\ h$, by means of which the pins are held in position in the slots at any desired distance from the center of the armature-shaft. Insulating-washers $h'\ h'$ are placed between the nuts $h\ h$ and the plate E, so as to insulate the pins H H therefrom.

Upon each of the pins H H is placed a loose collar I of insulating material, and upon the inner ends of collars I I are rigidly secured metallic rings $i$ $i$, to which in turn are attached flat springs $K'$ $K^2$ $K^3$ $K^4$, the ends of the springs being formed into rings $k$ $k$, so as to embrace the rings $i$ $i$, as clearly shown in the detail view, Fig. 5. To the outer ends of collars I I are attached brush-holders $L'$ $L^2$ $L^3$ $L^4$, in which are secured the double-ended brushes $M'$ $M^2$ $M^3$ $M^4$ by means of screws $m'$ $m^2$ $m^3$ $m^4$. The brushes $M'$ $M^3$ are of like polarity (say positive) and the brushes $M^2 M^4$ of like polarity, (say negative.)

The ring F is provided with radial wings $E'$ $E^2$ $E^3$ $E^4$, arranged at irregular intervals around the periphery of the ring, and each provided with a slot $e^2$, through which pass pins $f$ $f$, having nuts $f'$ $f'$, by means of which the pins may be adjustably secured in the slots. Frames N N, carrying each two small rollers $n$ $n$, are swiveled upon the ends of the pins $f$ $f$, and the free ends of the flat springs K K pass between these rollers.

Operation: The several parts being constructed and arranged as above described, the operation is as follows: The handle F' being in the position shown in Fig. 1, all the brushes will be in contact with the commutator, and the motor will move with full power in the direction of the arrow $x$. The position of the swivels N N relatively to the pins H H is such that by moving the handle F' to the left the brushes are successively raised from the commutator and the power of the motor gradually diminished. For instance, when the handle F' is moved to the position indicated by the dotted line $x'$ $x'$, the spring K' is unbent and the brush-holder L' turned upon the pin H, the brush M' being thereby raised from contact with the commutator, and the power of the motor thereupon reduced to one-half the maximum. When the handle is moved to the position indicated by line $x^2$ $x^2$, the brushes $M'$ $M^2$ are both out of contact and the power is reduced to one-quarter of maximum. The progressive movement of the handle being continued until the position indicated by dotted line $xx$ is reached, the brushes will be all out of contact with the commutator, and the power will be $nil$. Still further movement of the handle will bring it to position $x^3$ $x^3$, in which position the two brushes $M'$ $M^2$ will be brought into contact with the commutator, this position being equivalent to the position $x^2$ $x^2$, but with the opposite ends in contact, and the motor will revolve in the direction of the dotted arrow, and with one-quarter of maximum power. As the handle is brought in succession to the positions $x^4$ $x^5$, the brushes $M^2$ $M^3$ are brought into contact successively with the commutator, and the power of the motor is thereby gradually brought to maximum for the backward motion.

In the drawings the brushes are shown each making an angle of ninety degrees between the two extreme positions, and thus no allowance is made for the necessary "lead," which would of course be in the opposite direction for the forward and backward movements. This can be adjusted absolutely by adjusting the position of the pins H H. The points required must necessarily be somewhere on radial lines joining center of shaft and centers of pins H H; or the holders $L'$ $L^2$ may be arranged so that the brushes will be on opposite sides of the pins H H, in which case also as long as H is on the same radial line the amount of lead will be the same for both forward and backward motion of motor.

While I have shown and described a motor having but four brushes, it is obviously within the spirit of my invention to provide a motor having six, eight, or more poles with the above-described devices and to operate it in the same manner.

Having described my invention, I claim—

1. In an electric motor, the combination, with a commutator, of a movable section arranged to turn concentrically with said commutator, and four or more brushes connected to said section and adapted to be successively or at intervals raised out of contact with the commutator by the movement of the said section, substantially as described.

2. In an electric motor, the combination, with a commutator and four or more brushes, each secured in pivotal brush-holders adjacent to said commutator and with their free ends in contact therewith, of a movable section connected to each brush-holder by a spring, the springs being each strained to a greater degree than the preceding one, whereby as such section is moved the brushes will be successively raised from contact with the commutator, substantially as described.

3. In an electric motor, the combination of a commutator, a series of brushes, pivotal brush-holders, springs connected to said brush-holders, a movable section, and jaws or rollers carried by said section and adapted to embrace said springs, the jaws being arranged at variable intervals on a circular line concentric with said commutator, substantially as described.

4. In an electric motor, the combination, with a commutator and four or more double-ended brushes attached at the center to swiveled brush-holders, of a movable section carrying clamping-jaws arranged concentrically to said commutator at unequal distance apart, and springs projected through said jaws and connected to said holders, whereby the brushes may be successively raised from contact with the commutator and their opposite ends successively brought into contact therewith by a progressive movement of said movable section, substantially as described.

5. In an electric motor, the combination, with a commutator, brushes adapted to contact therewith, swiveled brush-holders, and a movable ring or section carrying clamping-jaws or rollers secured in swiveled frames adjustably secured to said movable section, of springs having one end attached to the brush-holders and the other end projected through said clamping-jaws, substantially as described.

6. In an electric motor, the combination, with commutator B, brushes M' M² M³ M⁴, and swiveled brush-holders L' L² L³ L⁴, of movable ring E, carrying swiveled frames N N, with clamping-rollers $n$ $n$, and flat springs K' K² K³ K⁴, attached to said brush-holders and passing between said rollers, all constructed and arranged substantially as described.

In testimony that I claim the foregoing I have hereunto set my hand this 18th day of September, 1888.

STANLEY C. C. CURRIE.

Witnesses:
 MORRIS R. BOCKIUS,
 ALBERT B. BLACKWOOD.